(12) United States Patent  
Moran et al.

(10) Patent No.: US 9,100,708 B2  
(45) Date of Patent: Aug. 4, 2015

(54) ELECTRONIC PROGRAM GUIDES, SYSTEMS AND METHODS PROVIDING A COLLAPSIBLE CHANNEL LISTING

(75) Inventors: William N. Moran, Highlands Ranch, CO (US); Alan Terry Pattison, Castle Rock, CO (US); Michael T. Dugan, Parker, CO (US); Anand Menon, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 163 days.

(21) Appl. No.: 13/601,279

(22) Filed: Aug. 31, 2012

(65) Prior Publication Data

US 2014/0068666 A1 Mar. 6, 2014

(51) Int. Cl.
*H04N 5/445* (2011.01)
*H04N 21/482* (2011.01)
*G06F 3/0482* (2013.01)
*H04N 21/45* (2011.01)

(52) U.S. Cl.
CPC ............ *H04N 21/482* (2013.01); *G06F 3/0482* (2013.01); *H04N 21/4532* (2013.01); *H04N 21/4821* (2013.01)

(58) Field of Classification Search
CPC . G06F 3/0481; G06F 3/0482; H04N 21/4532; H04N 21/42216; H04N 21/482; H04N 5/44543; H04N 2005/44569

USPC ............... 725/39–61; 715/700, 716, 719, 811
See application file for complete search history.

(56) References Cited

U.S. PATENT DOCUMENTS

| | | | |
|---|---|---|---|
| 6,249,320 B1 * | 6/2001 | Schneidewend et al. | 348/569 |
| 2010/0169832 A1 * | 7/2010 | Chang | 715/811 |
| 2010/0186049 A1 * | 7/2010 | Carhart et al. | 725/61 |
| 2012/0005709 A1 * | 1/2012 | Walter | 725/46 |

* cited by examiner

*Primary Examiner* — Farzana Hossain
(74) *Attorney, Agent, or Firm* — Ingrassia Fisher & Lorenz, P.C.

(57) ABSTRACT

A television receiving device includes a memory configured to store an electronic program guide. The electronic program guide is divided into channel listings including program information corresponding to television programs being broadcast currently and to television programs scheduled for future broadcast. The device further includes a user interface configured to receive a user input and a processor in communication with the memory and the user interface. The processor is configured to output the electronic program guide to be displayed with, alternatively: 1) at least one channel listing including an expansion icon, where upon the user input indicating a selection of the expansion icon, a single channel listing expands into a plurality of channel listings, or 2) at least one channel including a collapsing icon, where upon the user input indicating a selection of the collapsing icon, a plurality of channel listings collapse into a single channel listing.

12 Claims, 7 Drawing Sheets

| PROGRAM GUIDE | | | | 9:52AM FRI 2/29 | ? | AA | ▽ | △ |
|---|---|---|---|---|---|---|---|---|
| ALL CHAN | ALL SUB | HD | MY SPORTS | | | | | |

IRON MAN (ALL DAY) PG-13 MOVIE
ROBERT DOWNEY JR., TERRENCE HOWARD, GWENETH PALTROW (2008) A WEALTHY INDUSTRIALIST BUILDS AN ARMORED SUIT AND USES IT TO DEFEAT CRIMINALS AND TERRORISTS. BASED ON THE COMIC BOOK CHARACTER.

| 2/29 | 9:00 | 9:30 | 10:00 | 10:30 | 11:00 | 11:30 |
|---|---|---|---|---|---|---|
| 5500 BRAVO | i | JOE SIXPACK | PROBLEM CHILD | MY OWN WORST ENEMY | CHARMED | |
| 5501 TOON | INSIDE THE DEMON | MEET THE ROBINSONS | | | FRIENDS | |
| 5502 FX | ART SCHOOL CONFIDENTIAL | | MOTORSPORTS HOUR | | MY OWN WORST ENEMY | MY OWN WORST ENEMY |
| 5503 EACTN | SPORTS CENTER | | MOTORSPORTS HOUR | | JOE THE PLUMBER | |
| 5504 TNT | SHADOWS AND FOG | | THE OFFICE | | THE TV SET | PROBLEM CHILD |

FIG. 2

ELECTRONIC PROGRAM GUIDES, SYSTEMS AND METHODS PROVIDING A COLLAPSIBLE CHANNEL LISTING

TECHNICAL FIELD

The inventive field relates generally to electronic program guides (EPGs) used by a client device, such as a set top box (STB), digital video recorder (DVR), or similar device. The inventive field also relates to providing an enhanced electronic program guide for such devices, and devices providing an enhanced electronic program guide.

BACKGROUND

The proliferation of subscription television programming, the increasing number of available channels, and the corresponding increase in television programming have led to continued development of onscreen program directories and guides. Such onscreen programming solutions, collectively referred to herein as electronic program guides, have ranged from program information for each channel scrolling vertically across the screen to user controllable interfaces that allow users to examine scheduling information describing television programs currently on-air and to be broadcast in the future.

In direct broadcast satellite (DBS) systems, EPG information is periodically downloaded and updated, usually at regular intervals. Prior art approaches have allowed users to examine scheduling information that has been downloaded to the client device, either by scrolling sequentially through listings corresponding to one-half hour or hour increments or by directly accessing individual timeslots. Further, some EPGs may allow a user to directly access desired programs or even set programs to be recorded automatically.

Known EPGs provide access to program information in various ways. EPGs generally provide program information, such as the channel, the time slot and duration, and the title of the program. Other information about the program, such as a brief description of the content and/or the names of the actors, may also be presented.

With the ever-increasing number of channels available for user selection, EPGs are becoming increasingly lengthy. That is, for each additional channel included in the broadcast, a corresponding additional entry needs to be included in the EPG. As such, users are finding it increasingly difficult to scroll through the various listings to find desired programming. As such, it would be desirable to provide systems and methods providing an electronic programming guide that is easy to navigate, and allows a user to more quickly identify and select desirable programming. Furthermore, other desirable features and characteristics of the present disclosure will become apparent from the subsequent detailed description the appended claims, taken in conjunction with the accompanying drawings and background.

BRIEF SUMMARY

The various embodiments disclosed herein relate to systems and methods for providing electronic program guides (EPGs) used by a client device, such as a set top box (STB), digital video recorder (DVR) or similar device. In one embodiment, disclosed herein is a television receiving device includes a memory configured to store an electronic program guide. The electronic program guide is divided into channel listings including program information corresponding to television programs being broadcast currently and to television programs scheduled for future broadcast. The device further includes a user interface configured to receive a user input and a processor in communication with the memory and the user interface. The processor is configured to output the electronic program guide to be displayed with, alternatively: 1) at least one channel listing including an expansion icon, where upon the user input indicating a selection of the expansion icon, a single channel listing expands into a plurality of channel listings, or 2) at least one channel including a collapsing icon, where upon the user input indicating a selection of the collapsing icon, a plurality of channel listings collapse into a single channel listing.

In some embodiments, the processor is configured to output the electronic program guide to be displayed with at least one channel listing including an expansion icon. Upon expansion of the single channel listing into the plurality of channel listings, at least one of the plurality of channel listings is provided to include a collapsing icon. And, upon receiving a second user input indicating a selection of the collapsing icon, a plurality of channel listings collapse into the single channel listing. In other embodiments, the processor is configured to output the electronic program guide to be displayed with at least one channel including a collapsing icon. Upon collapsing the plurality of channel listings into the single channel listing, the single channel listing is provided to include an expansion icon. And, upon receiving a second user input indicating a selection of the expansion icon, the single channel listing expands into the plurality of channel listings.

In another embodiment, disclosed herein is a method of accessing program information in an electronic program guide includes storing an electronic program guide on a client device. The electronic program guide is divided into channel listings including program information corresponding to television programs being broadcast currently and to television programs scheduled for future broadcast. The method further includes receiving a user input at the client device. Still further, the method includes outputting, in response to the first user input, the electronic program guide from the client device to be displayed with, alternatively: 1) at least one channel listing including an expansion icon, wherein upon the user input indicating a selection of the expansion icon, a single channel listing expands into a plurality of channel listings, or 2) at least one channel including a collapsing icon, wherein upon the user input indicating a selection of the collapsing icon, a plurality of channel listings collapse into a single channel listing.

In some embodiments, the method can include outputting the programming guide initially with either an expansion icon or a collapsing icon based upon a user selected preference. In other embodiments, the method can include outputting the programming guide initially with either an expansion icon or a collapsing icon based upon an observed pattern of user channel selection.

In yet another embodiment, disclosed herein is a computer-readable storage medium including instructions stored thereon that, when executed by a processor, cause the processor to provide an electronic program guide for display on a viewing screen by accessing the electronic program guide. The electronic program guide is divided into channel listings including program information corresponding to television programs being broadcast currently and to television programs scheduled for future broadcast. The processor is further caused to output, in response to a user input, the electronic program guide to be displayed with, alternatively: 1) at least one channel listing including an expansion icon, wherein upon the user input indicating a selection of the expansion icon, a single channel listing expands into a plurality of channel listings, or 2) at least one channel including a collapsing icon, wherein upon the user input indicating a selection of the collapsing icon, a plurality of channel listings collapse into a single channel listing.

In some embodiments, the expansion icon is provided as a "+" symbol and the collapsing icon is provided as a "−" symbol. Further, in some embodiments, each of the plurality of channel listings expanded from the single channel listing is designated as a subset of the single channel listing.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

The disclosed embodiments will hereinafter be described in conjunction with the following drawing figures, wherein like numerals denote like elements, and wherein:

FIG. 2 illustrates an example of a display of an exemplary EPG output as is known in the art;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, the terms "electronic programming guide" or "EPG" are intended to encompass an interface provided to a user and an underlying television broadcast system or component that supports functionality with the programming content. The novel EPG described herein may be considered to be embodied in the interface, a display, such as a televisions or monitor, software and/or hardware, either alone or in combination. As such, the term EPG is used in a broad sense for the sake of clarity in the description, without being limiting.

The embodiments shown in the Figures illustrate graphical user interfaces, methods and systems that may provide an enhanced EPG. Enhancements may relate to providing an EPG that allows multiple channel listings to be collapsed into a single channel listing on the EPG, which is expandable at the user's election. For example, the EPG may present a category of channels, such as music channels, movie channels, sports channels, or other channel categorization scheme as a single entry on the EPG, with the option for the user to expand the single entry into multiple entries, i.e., one entry for each individual channel in the category.

As described herein, displaying a category of channels as a single entry on the EPG may allow users to more easily scroll through the EPG to find desired programming. In other words, by collapsing a category of channels into a single entry on the EPG, the EPG contains fewer entries, which is expected to be easier and faster for the user to navigate. Once the user identifies a particular category of channels that may contain a particular channel that the user may be desirous of viewing, the user can expand the collapsed EPG listing such that each channel in the category is displayed in an individual listing on the EPG. Thus, a user may be provided with a simplified EPG that more easily allows the user to identify and access desirable programming.

Various implementations are possible. For example, satellite, cable, analog or digital terrestrial, internet or other broadcasting technologies may be suitable. Thus, while the following description provides an example in the context of a television service provider employing a satellite broadcast system, it should be understood that such description is not limiting.

Figure 1:
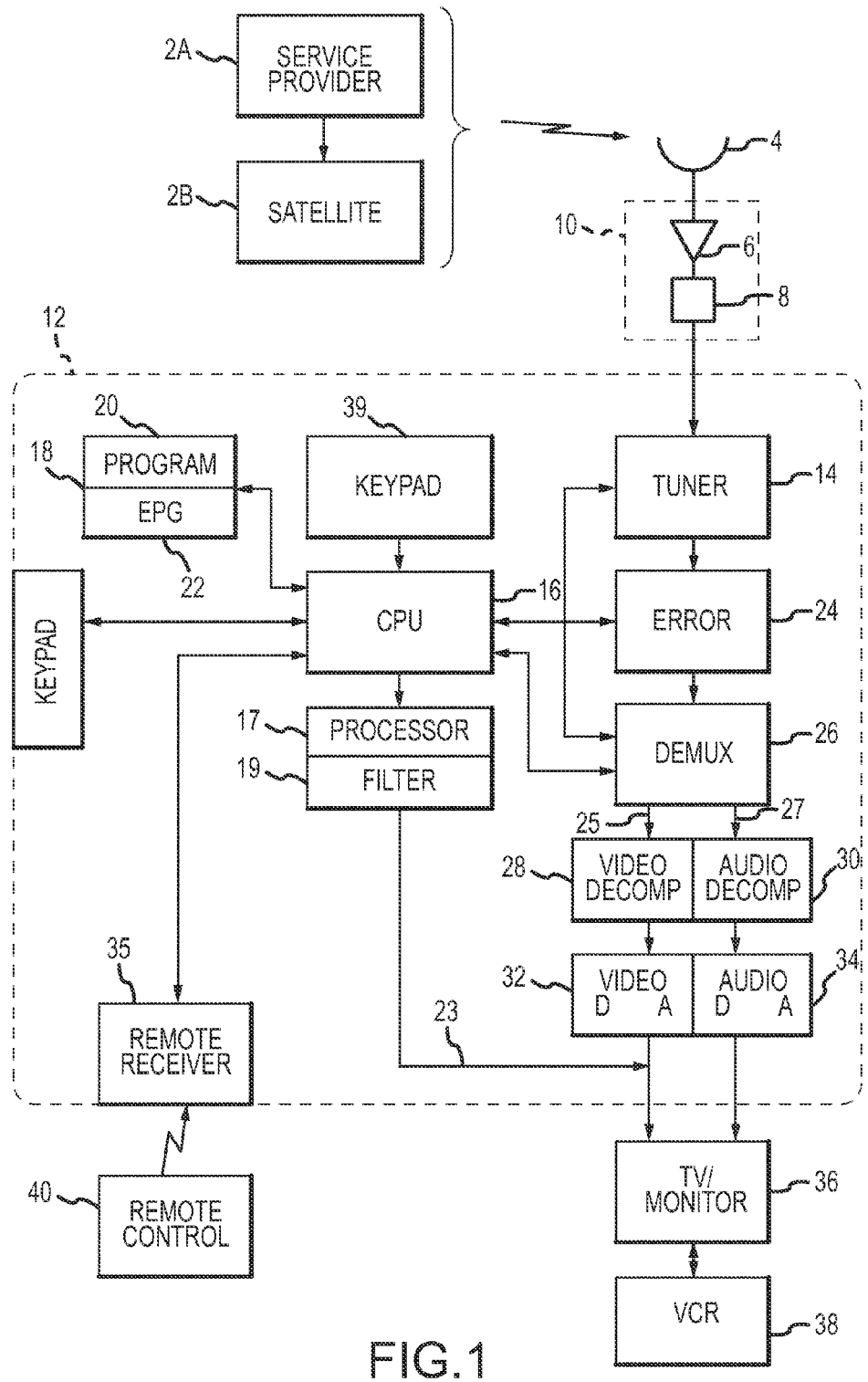
FIG. 1 is a block diagram illustrating major components of an example of a direct broadcast satellite television system.
Figure 3A:
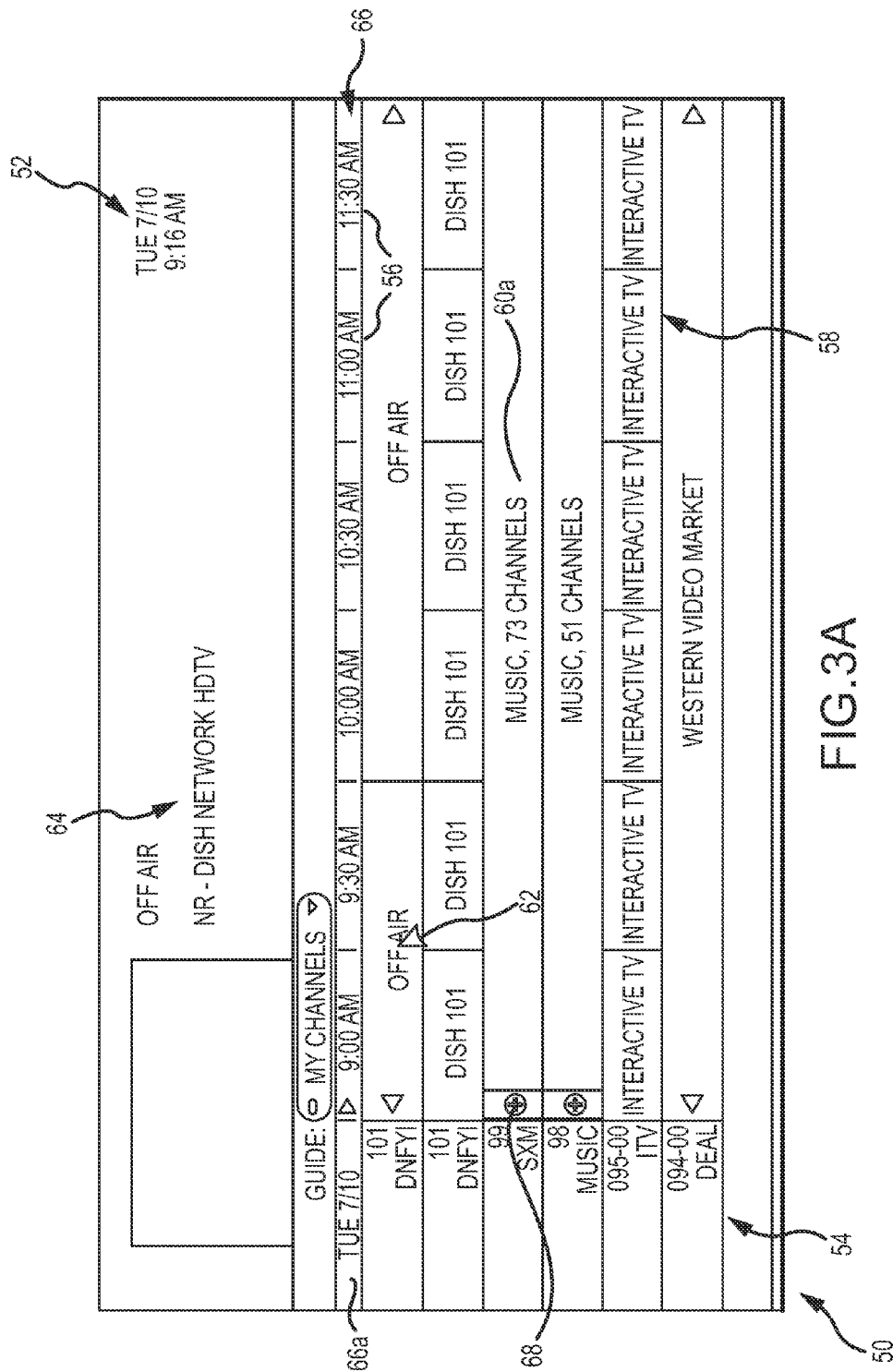
FIG. 3A-3B illustrate examples a display of a collapsible EPG output depicted with a category of channel listings in a collapsed state.
Figure 3B:
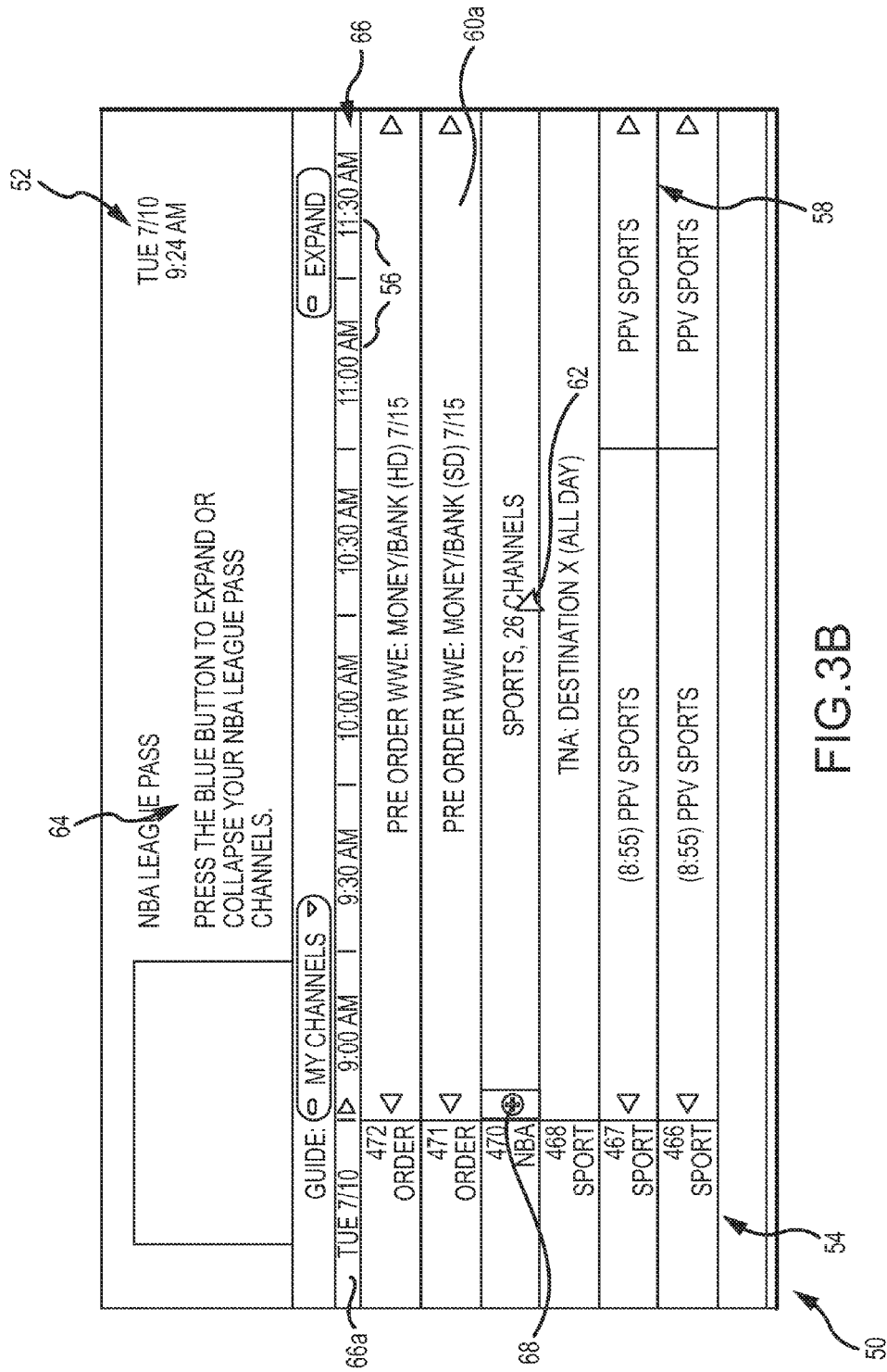
Figure 4A:
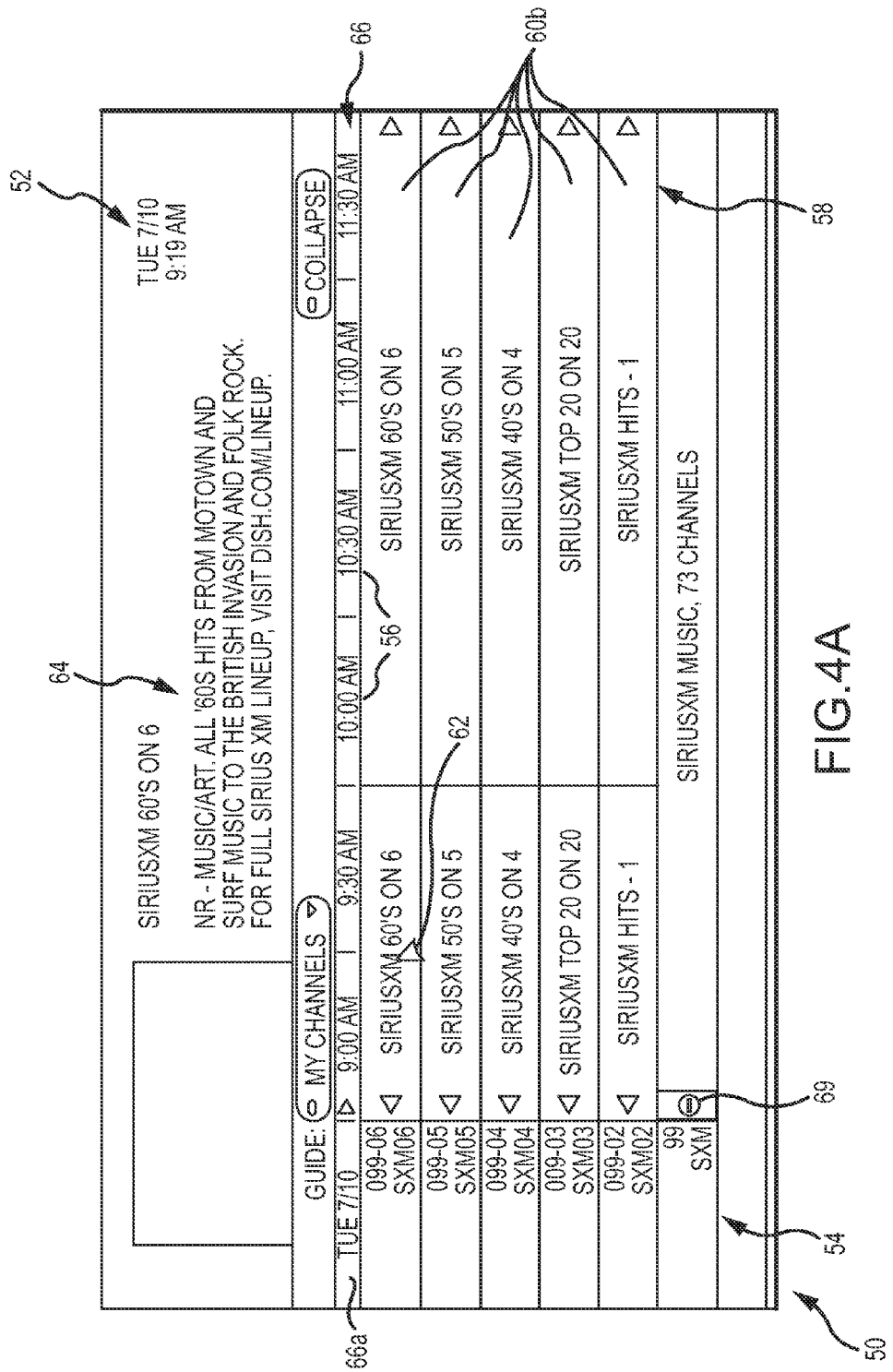
FIGS. 4A-4B illustrate examples of a display of collapsible EPG output depicted with a category of channel listings in an expanded state.
Figure 4B:
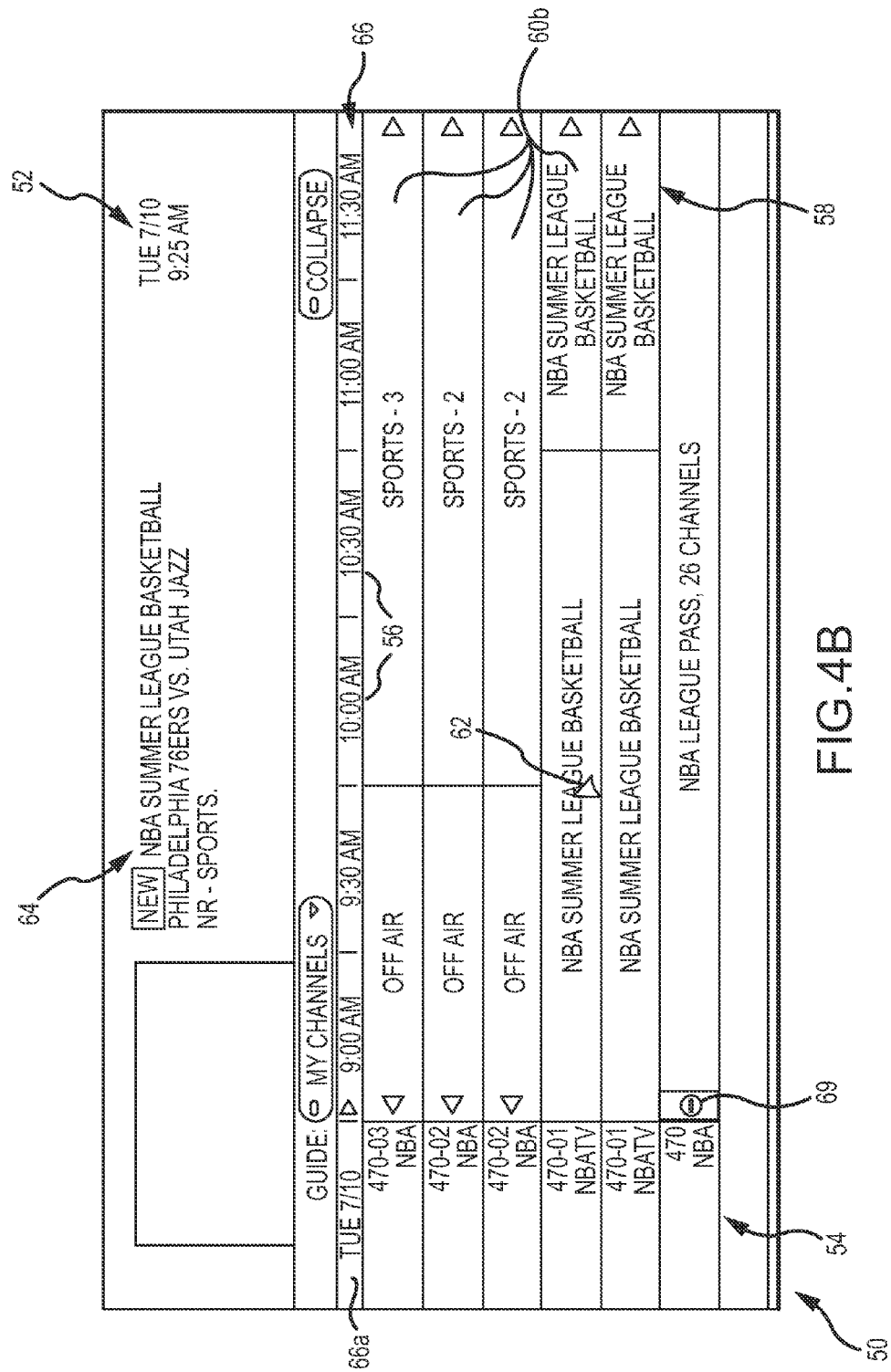
Figure 5:
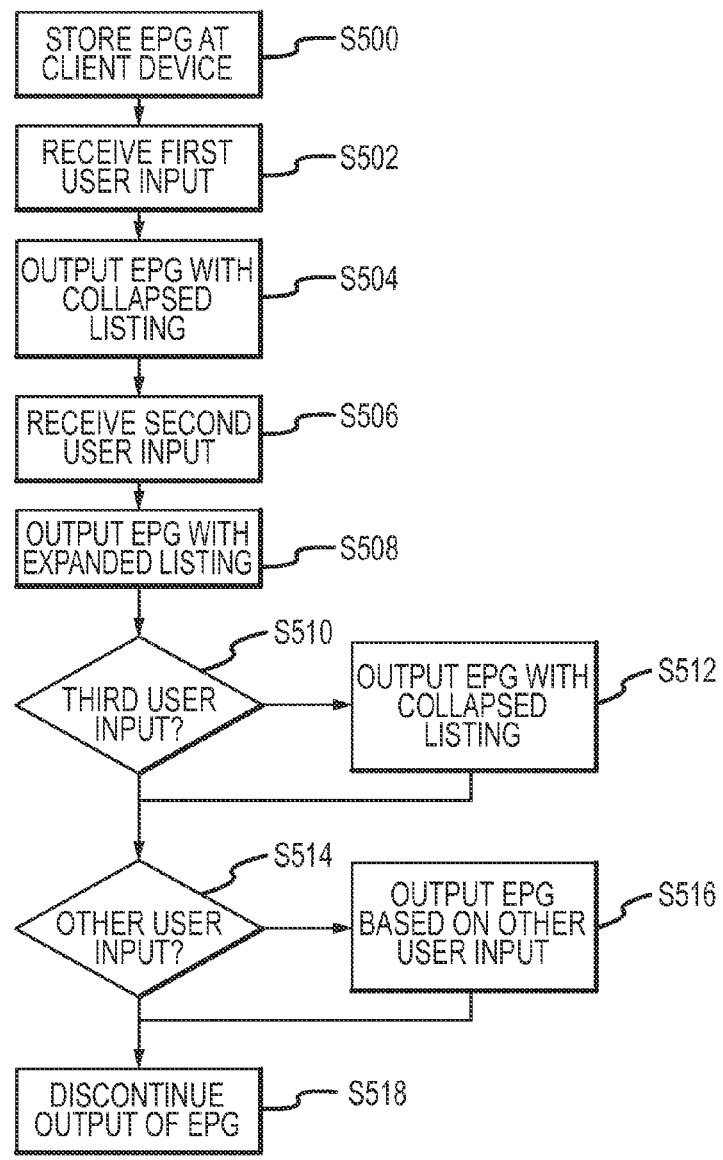
FIG. 5 is a flowchart illustrating a method of providing a collapsible EPG.

The block diagram shown in FIG. 1, the displays shown in FIGS. 2, 3A-B and 4A-B, and the flowchart shown in FIG. 5 are for illustration only and are not intended to represent the only possible displays, process flows and system configurations. In particular, it should be understood that process steps may be added, omitted and reordered as may be suitable to a particular application. Also, individual components may be added, omitted, replaced and interrelated as may be suitable to a particular application. All details appurtenant to implementing the exemplary processes and systems that are well understood in the art are omitted for simplicity and clarity.

FIG. 1 is a block diagram that shows various components that may be used to implement various features of the present disclosure. It should be understood that this diagram and the description thereof is intended to provide a general understanding of how the principles described herein may be implemented, and is not exhaustive of implementations that may be envisioned. For example, a direct broadcast satellite system incorporating packetized transmission according to the MPEG-2 standard may be used, although any programming source that includes an EPG, or transmits data to be incorporated into an EPG, is contemplated. Encrypted direct broadcast satellite (DBS) signals may be transmitted from a source 2, such as a television service provider 2A via a satellite 2B. Such signals may be received as downlinked signals by a satellite antenna 4, such as a parabolic dish of approximately eighteen to thirty-six inches in diameter in one embodiment. Front end processing of the satellite signals may be accomplished by a low noise block converter feed (LNBF) provided in the antenna focal point. This may include a converter module 10 with a low noise amplifier 6, which receives the signals from the feed, and by a down converter 8, which converts the entire frequency band of the satellite signals to a lower frequency range that may be efficiently transmitted, for example, via coaxial cable to a client device, such as a satellite receiver 12. A tuner 14 may select a specific channel from the downlinked signal 2 and feed the selected channel to an error correction and packet synchronization module 24. The error correction and packet synchronization module 24 may output a fully compliant transport stream, which may be directed to a packet demultiplexer 26. Various encoding or formats may be used.

The packet demultiplexer 26 may be an integrated circuit that accepts the packetized, time domain multiplexed data stream of the transport stream and routes the packets to various areas within the satellite receiver 12. Audio may be output as an audio stream 27, which may be accepted by an audio decompresser 30. Video may be output as a video stream 25, which may be accepted by a video decompresser 28. The audio stream 25 and the video stream 27 may be fully compliant audio and video program elementary streams, respectively. In addition to routing packets of data, the packet demultiplexer 26 may also descramble encrypted data, provide various buffering of the formatted data, and handle a program clock reference to keep a local clock synchronized with the clock at the uplink center (e.g., service provider 2A). Data 29 may be output from the demultiplexer 26 and routed to a central processing unit (CPU) 16, which may assemble the data 29 into an EPG 22 stored in a memory or other storage medium 18.

The video decompresser 28 and the audio decompresser 30 may accept one or more video stream 25 and/or audio stream 27, respectively, and decompress them into baseband digital signals. The video stream 25 may then fed to a video digital to analog converter 32 and the audio stream 27 may be fed to a video digital to analog converter 34. The converters 32 and 34 may decode the digital signals and output resulting analog baseband signals to a TV/monitor 36 and/or a VCR device 38.

The EPG 22 may include a database or otherwise access a database containing information including, for example, names or titles of viewing events (programs), corresponding channel numbers and names, brief descriptions of the programs, start and finish times, and rating and content information related to the events. The central processing unit 16 may execute an EPG program 20, which may take the information stored in the EPG 22 and output a graphic file to a processor 17. The processor 17 may process the graphic file and output a signal, which, after being filtered by a filter 19, may become a video baseband signal 23 that may be combined with the video baseband signal 25 to be displayed on the television/monitor 36.

A user may manipulate the satellite receiver 12 via a keypad 39 or a remote control device 40. The remote control device 40 may communicate with the CPU 16 by sending an infrared, radio frequency, or other wired or wireless signal to a remote receiver 35, which may transfer commands to the CPU 16.

The EPG program 20 may include an instruction set that creates the EPG 22 and allows a user to manipulate the EPG 22, as discussed further below. While the EPG program 20 may be implemented as hardware, the EPG program 20 may alternatively or additionally include a software program stored in the memory 18. Memory 18 may be random access memory (RAM), but also may be flash, ferroelectric, or other nonvolatile memory, or conventional RAM with a battery backup. An LSI 64002 microprocessor may be used for the central processing unit 16. Also, the processor 17 may be an NTSC processor, such as the Sony CXD 1910, or anything else suitable.

An exemplary EPG display, familiar to those having ordinary skill is the art, is illustrated in FIG. 2. As shown therein, programming information contained in the EPG 22 may be displayed on the TV/monitor 36 in the form of a screen or graphical user interface 50. As an example, the screen or interface 50 may allow the user to examine programming information contained in the EPG 22 for programs scheduled for up to at least two days into the future, although the number of days is not so limited. The user may summon the screen or interface 50, for example, by pressing the GUIDE key on the remote control device 40 or the keypad 39.

Current date, day of the week, and time 52 may be displayed in the screen or interface 50. The screen or interface 50 may list channels 54 in a column at a left edge, and may present timeslots 56 in a row across so as to form a grid 58 defined by the channels 54 and timeslots 56. For example, timeslots 56 may be divided into 30 minute intervals, but other intervals may be used as well. Titles or descriptions corresponding to individual programs 60 may be displayed corresponding spaces in the grid 58. Upon summoning of the screen or interface 50, a cursor 62 may be placed upon the program corresponding to the programming selection currently being viewed. The cursor 62, illustrated as an arrowhead in FIG. 2, may be implemented in any desired manner, for example, by drawing a box around the program, highlighting the program, or the like. Any of the programs may be selected for viewing by moving the cursor to the desired program via arrow keys located on the remote control device 40 or the keypad 39 and pressing the SELECT key, for example. Scrolling using a touch pad on the remote control device 40 may also provide such movement. If the selected event is to be shown in the future, the user may set up an event timer. Further, as the cursor 62 is placed over a particular one of the programs 60, additional information 64 regarding the particular program may be presented.

The user may traverse the channels 54 by scrolling via vertical arrow keys, a touchpad, or the like on the remote control device 40 or the keypad 39. The timeslots 56 may be traversed either by scrolling via left and right arrow keys, a touchpad or the like, or by specifying a number of hours, forward and/or reverse as available. As the timeslots 56 are traversed, a header 66 indicating times of the timeslots 56 may change as needed to correspond to timeslots as they are displayed. A date 66a, which may or may not be part of the header 66, may be included in the EPG to identify the date of the timeslots 56 currently included in the EPG. Thus, the date 66a may also change as needed. Such movement may be implemented by buttons on the remote control device that are configured to move the cursor a preset number of hours, forward or reverse. However, in such approaches for accessing programming information, the user moves sequentially through the programming information in the EPG.

It will be appreciated that as the number of channels provided in a broadcast increases, so too do the listings provided on the EPG. As such, in some instances, it may be desirable to "collapse" one or more channels of a particular category into a single channel listing on the EPG in order to allow the user to more easily navigate the EPG, and to allow the user to more easily find desired programming. While any number of categories may in theory be devised to provide a collapsed EPG listing, it will be appreciated that the systems and methods described herein may find their best use in connection with channels that experience relatively low viewership as compared to other channels. In this manner, the user is able to scroll past multiple channels in an EPG that the user is less likely to be desirous of watching, making it easier to find desirable programming by virtue of reduced listings in the EPG. Of course, in the event that a user does desire to select one of the channels that has been collapsed into a single listing on the EPG, the presently described systems and methods allow for the easy expansion of the single collapsed listing into an expanded listing wherein each of the channels previously included in the collapsed listing are provided their own individual listing on the EPG.

Without limitation, the following categories of channels may be suitably provided in a collapsed EPG listing. For example, it is now commonplace for broadcast signals to include one or more dedicated music channels, each such music channel being dedicated to a particular style of music. In one embodiment, such music channels are derived from satellite radio broadcasts, as is known in the art. As currently implemented, such dedicated music channels are typically provided with channel numbers greater than most traditional television programming channels, as users tend to select dedicated music channels less often than traditional television programming. In this manner, a user who starts scrolling through the EPG at the lower channel numbers will scroll through the more popular traditional television programming before reaching the dedicated music channels. However, in accordance with the present disclosure, all of the dedicated music channels can be collapsed into a single listing on the EPG, which can be expanded at the election of the user, and in this manner the overall EPG listings are reduced, and users desirous of selecting dedicated music channels need not scroll all the way to the end of the EPG listings in order to find the channel that they are seeking.

In another example, it is now commonplace for broadcast signals to include one or more dedicated sports channels, each such sports channel being dedicated to a particular sport, or a particular sports channel. Here again, for users who are not seeking to watch a sports channel, it can be cumbersome to scroll through each such channel on the EPG to reach the listings of other programming. However, in accordance with the present disclosure, all of the dedicated sports channels can be collapsed into a single listing on the EPG, which can be expanded at the election of the user. Of course, the examples of dedicated music and sports channels are merely exemplary, and numerous other such categorizations of channels can easily be devised in accordance with the teachings herein. Nor is the present disclosure restricted to creating categories based on the level of viewership of such channels. Rather, it is envisioned that categories may be desirable for numerous other reasons.

In accordance with the aforementioned exemplary embodiments, FIG. 3A depicts an EPG wherein a plurality of the dedicated music channels have been collapsed into a single listing 60a. As shown therein, channel 99, as opposed to listing a particular music channel, lists a particular category of channels, i.e. "Music" as shown. (It is also noted that channel 98 is provided as a collapsed single listing. In general, it will be appreciated that any number of channels in the EPG may be collapsed into any number of collapsed single listings, as desired.) In one embodiment, the single collapsed listing 60a can be labeled in a manner that is indicative of the category of channels collapsed therein. For example, in FIG. 3A, the label "Music," as noted above, is indicative that a plurality of music channels are collapse into the channel 99 listing. Provided in connection with this listing 60a is an expansion icon 68, that the user can select to expand the listing of music channels so as to provided each such channel its own individual listing on the EPG. The expansion icon 68 can be located anywhere on the EPG, but is preferably located in the vicinity of the collapsed listing 60a to be expanded. For example, as shown in FIG. 3A, the icon 68 is provided adjacent to the channel number (99), such that it is immediately apparent to the user that the listing is a collapsed listing. In contrast, other channel listings without the expansion icon (such as 101 in FIG. 3A) do not include the expansion icon 68, indicating a traditional channel listing 60, as described above with regard to FIG. 2.

Likewise, FIG. 3B depicts an EPG wherein a plurality of the dedicated sports channels have been collapsed into a single listing 60a. As shown therein, channel 470, as opposed to listing a particular sports channel, lists a particular category of channels, i.e., "Sports" as shown. Again, provided therewith is an expansion icon 68 that the user can select to expand the listing of sports channels.

With particular regard to the expansion icons 68 in the exemplary EPG listings 3A and 3B, in one embodiment, such icon can be selected in the same manner as with any of the EPG listing features as described above with regard to FIG. 2. For example, in order to select the expansion icon 68, the user can use the remote control to select the expansion icon, and provide an input to the system via the remote control indicating a selection of such icon. With regard to the particular format of the expansion icon, while a "+" symbol is depicted in these exemplary embodiments, as indicative of the user making an "expansion" choice, other suitable symbols, characters, words, pictures, etc. may be provided as the expansion icon for the user to select to expand the category listing.

Reference is now made to the exemplary EPG listings depicted in FIGS. 4A and 4B. FIG. 4A corresponds to the EPG listing depicted in FIG. 3A, with the channel 99 being provided in the expanded state, i.e., with each dedicated music channel being provided its own listing 60b on the EPG. Likewise, FIG. 4B corresponds to the EPG listing depicted in FIG. 3B, with the channel 470 being provided in the expanded state. As shown in FIG. 4A, each music channel of the category is provided a channel number that is a subset of the number indicated in the collapsed listing. For example, in FIG. 4A, the channel listings 60b for each music channel are provided as 99-01, 99-02, 99-03, . . . 99-n. Likewise, in FIG. 4B, the channel listings 60b for each sports channel are provided as 470-01, 470-02, 470-03, . . . 470-n. Other suitable subsets are also envisioned, including letter suffixes (-a, -b, -c . . . ), symbolic suffixes (-@, -#, -$, . . . ) and the like to indicate that the particular channel listing is a subset of the collapsed channel listing 60a.

In an exemplary embodiment, each of the expanded listings 60b provides the same information as the regularly depicted channel listings 60 on the EPG, as discussed above with regard to FIG. 2. The information includes, without limitation, program name, time, channel, and additional information regarding the programming contained therein upon the selection thereof. As such, the expanded listings 60b can contain any or all of the information as traditional, non-collapsible channels listings 60, and may appear in the same format and in the same manner as such channel listings.

Also with each expanded EPG channel listing 60b as shown in FIGS. 4A and 4B is provided a collapsing icon 69, which the user can select to return the EPG listings back to the collapsed state 60a as shown and described above with regard to FIGS. 3A and 3B. With particular regard to the collapsing icons 69 in the exemplary EPG listings 4A and 4B, in one embodiment, such icon 69 can be selected in the same manner as with any of the EPG listing features as described above with regard to FIG. 2. For example, in order to select the collapsing icon 69, the user can use the remote control to select the collapsing icon 69, and provide an input to the system via the remote control indicating a selection of such icon. With regard to the particular format of the collapsing icon 69, while a "-" symbol is depicted in these exemplary embodiments, as indicative of the user making a "collapsing" choice, other suitable symbols, characters, words, pictures, etc. may be provided as the collapsing icon for the user to select to expand the category listing.

While the foregoing embodiments have been described above with regard to a system wherein the EPG is provided with a channel category in the collapsed state upon the user displaying the EPG, it will be appreciated that in other embodiments, the categories will be provided initially in the expanded state. For example, it may be the case that a user often selects one or more channels in a category of channels that can be provided in the EPG in the collapsed state. As such, rather than requiring the user to expand the collapsed listing each time upon opening the EPG, the EPG can initially be provided with such channel category in the expanded stated, as in FIGS. 4A and 4B, for example. Whether a given category of collapsible channels is initially provide in the collapsed or expanded state can be made configurable by the user, for example by making an appropriate selection in a settings menu of the display system. Alternatively, whether a given category of collapsible channels is initially provide in the collapsed or expanded state can be determined by the system based upon observed channel selection behavior by the user. For example, if the user selects a given channel within a collapsible category a given number of times, or a given frequency within a pre-determined time period, the system can automatically make such channels appear in the expanded state initially to such user. Further, in embodiments wherein more than one collapsible category of channels is provided on the EPG, the initial state of each channel may be determined individually according to any of the manners noted above.

It should be understood that implementation of the EPG is not limited to that described above. Any known systems and methods for implementing an EPG as known in the art may be employed to achieve the basic operations of an EPG as described above, or other operations of an EPG as may be appropriate or desired for a given application. In other words, although embodiments are described herein with respect to the implementation of an EPG in the form of a grid as described above, it should be understood that other implementations are possible and not excluded.

It should also be understood that various implementations of methods for providing and displaying collapsible and expandable listings in an EPG are possible and may be envisioned based on the foregoing description. A particular example of one method is illustrated in FIG. 5. It should be understood that the method illustrated in FIG. 5 is a relatively simplistic, high level description, and that various modifications may be envisioned for particular applications, as appropriate or desired.

Control may begin at S500, with EPG information including timeslot, program information, and the like, for display may be stored at a television receiving device or client device. The EPG information may be stored on the client as illustrated in FIG. 1, or may be stored locally elsewhere, as appropriate or desired. It should be understood that S500 may be optional, as access to the EPG information need not be local.

Next, at S502, a first user input may be received by the client device. The first user input may result, for example, from the user pressing a button on a remote control device and/or user interaction with a graphical user interface displayed by the client device via a display device, such as a television. In response to the first user input, at S504 the client device may output the EPG information to be displayed with timeslots and program information for the timeslots of the current date. Further, the client device may output the EPG information wherein at least one category of channels is collapsed into a single listing on the EPG, i.e., with each of the individual channels in the category being represented as a single category listing on the EPG. The particular EPG information output for display may be determined in any suitable manner, such as based on the current date, time and tuned channel as known in the art. Further, the format of the EPG information output for display may be determined based on settings at the client device, for example, as known in the art.

Next, at S506, a second user input may be received by the client device. The second user input may result, for example, from the user interacting with a graphical user interface as described above, or from the user pressing a button or other input means on the remote control device. At S508, the client device may output the EPG information to be displayed with the at least one category of channels in an expanded state, for example, with each of the individual channels in the category occupying an individual listing on the EPG. It will be appreciated that, in the expanded state, not all of the individual channel listings in the at least one category may be visible on the display, for example if there are more channels in the category than listing space available on the display. In this case, it will be appreciated that the user will be able to scroll up/down to view the additional channel listings, in the usual manner as described above with regard to FIG. 2.

Once the EPG including the expanded channel listings is output for display, a determination maybe made at S510 as to whether a third user input is received. If so, then the client device may output the EPG information wherein at least one category of channels is collapsed into a single listing on the EPG, i.e., with each of the individual channels in the category being represented as a single category listing on the EPG at S512. In this manner, it will be appreciated that the user can provide inputs to the system that alternatively cause the at least one category to be displayed by the client device in either the collapsed or expanded state. As such, in one embodiment, the user inputs described in this exemplary method can correspond with a selection of the "+" or "−" icons as shown in FIGS. 3 and 4 to expand or collapse the display, respectively.

If no such third input is received, a determination maybe made at S514 as to whether other user input is received. Other user input may be of any kind, and may cause the client device to output the EPG based on the other output at S516. For example, the other input may be a user input that causes navigation via the timeslots, specifies a channel, specifies a timeslot, or otherwise changes the EPG to be output at S516.

Thus, it should be understood that continuing control of the output of the EPG information for display may be performed in any suitable manner, as appropriate or desired. It should also be understood that the other user input determined as received at S514 is for continued output of the EPG information for control to continue to 5516. Otherwise, control may proceed to S518, where the output of the EPG information may be discontinued. For example, if the other user input received is selection of a particular program to be displayed, the EPG information may no longer be displayed. Alternatively or additionally, control may proceed to S518 after elapse of a predetermined amount of time without receiving further user input.

Again, it should be understood that the processes described above with respect to FIG. 5 is only an example, and is not intended to illustrate all possible processes that may be envisioned for implementing the various features described herein. As such, although not shown for the sake of clarity and simplicity, it should be understood that the various features described above may be incorporated in the method, as appropriate or desired, or any other suitable processes may be employed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment, it being understood that various changes may be made in the function and arrangement of elements described and methods of preparation in an exemplary embodiment without departing from the scope of the invention, which is set forth in the appended claims and their legal equivalents.

What is claimed is:

1. A television receiving device, comprising:
   a memory that stores an electronic program guide, the electronic program guide divided into channel listings comprising program information corresponding to television programs being broadcast currently and to television programs scheduled for future broadcast;
   a user interface that receives a user input; and
   a processor in communication with the memory and the user interface, wherein the processor outputs the electronic program guide to be displayed with at least one channel listing including an expansion icon that is specifically associated with the at least one channel listing and not associated with other channel listings shown on the electronic programming guide, wherein upon the user input indicating a selection of the expansion icon, a single channel listing expands into a plurality of channel listings,
   wherein the processor further outputs the electronic programming guide to be displayed with at least one channel including a collapsing icon, wherein upon the user input indicating a selection of the collapsing icon, a plurality of channel listings collapse into a single channel listing, and
   wherein, after a period of time observing a pattern and history of user channel selection that is based upon a frequency of channel selection within the period of time, the processor further outputs the electronic programming guide upon a user's command to display the electronic programming guide with either an expansion icon or a collapsing icon based upon the observed pattern and history of user channel selection, wherein the expansion icon is output with channels that are observed to be selected with lesser frequency and the collapsing icon is output with channels that are observed to be selected with greater frequency.

2. The television receiving device of claim 1, wherein the processor further outputs the electronic program guide to be displayed with at least one channel listing including the expansion icon, and wherein, upon expansion of the single channel listing into the plurality of channel listings, at least one of the plurality of channel listings is provided to include the collapsing icon, wherein upon receiving a second user input indicating a selection of the collapsing icon, a plurality of channel listings collapse into the single channel listing.

3. The television receiving device of claim 1, wherein the processor further outputs the electronic program guide to be displayed with at least one channel including the collapsing icon, and wherein, upon collapsing the plurality of channel listings into the single channel listing, the single channel listing is provided to include the expansion icon, wherein upon receiving a second user input indicating a selection of the expansion icon, the single channel listing expands into the plurality of channel listings.

4. The television receiving device of claim 1, wherein the expansion icon is provided as a "+" symbol and the collapsing icon is provided as a "−" symbol.

5. The television receiving device of claim 1, wherein each of the plurality of channel listings expanded from the single channel listing is designated as a subset of the single channel listing.

6. A method of accessing program information in an electronic program guide, the method comprising:
   storing an electronic program guide on a client device, the electronic program guide divided into channel listings comprising program information corresponding to television programs being broadcast currently and to television programs scheduled for future broadcast;
   receiving a user input at the client device;
   outputting, in response to the first user input, the electronic program guide from the client device to be displayed with at least one channel listing including an expansion icon that is specifically associated with the at least one channel listing and not associated with other channel listings shown on the electronic programming guide, wherein upon the user input indicating a selection of the expansion icon, a single channel listing expands into a plurality of channel listings;
   outputting the electronic programming guide from the client device to be displayed with at least one channel including a collapsing icon, wherein upon the user input indicating a selection of the collapsing icon, a plurality of channel listings collapse into a single channel listing;
   for a period of time, observing a pattern and history of user channel selection that is based upon a frequency of channel selection within the period of time; and
   outputting the electronic programming guide after the period of time and upon a user's command to display the electronic programming guide with either an expansion icon or a collapsing icon based upon the observed pattern and history of user channel selection, wherein the expansion icon is output with channels that are observed to be selected with lesser frequency and the collapsing icon is output with channels that are observed to be selected with greater frequency.

7. The method of claim 6, comprising outputting the electronic program guide to be displayed with at least one channel listing including the expansion icon, and wherein, upon expansion of the single channel listing into the plurality of channel listings, at least one of the plurality of channel listings is provided to include the collapsing icon, wherein upon receiving a second user input indicating a selection of the collapsing icon, a plurality of channel listings collapse into the single channel listing.

8. The method of claim 6, comprising outputting the electronic program guide to be displayed with at least one channel including the collapsing icon, and wherein, upon collapsing the plurality of channel listings into the single channel listing, the single channel listing is provided to include the expansion icon, wherein upon receiving a second user input indicating a selection of the expansion icon, the single channel listing expands into the plurality of channel listings.

9. The method of claim 6, further comprising designating as a subset of the single channel listing each of the plurality of channel listings expanded from the single channel listing.

10. A non-transitory computer-readable storage medium including instructions stored thereon that, when executed by a processor, cause the processor to provide an electronic program guide for display on a viewing screen by:
    accessing the electronic program guide divided into channel listings comprising program information corresponding to television programs being broadcast currently and to television programs scheduled for future broadcast; and
    outputting, in response to a user input, the electronic program guide to be displayed with at least one channel listing including an expansion icon that is specifically associated with the at least one channel listing and not associated with other channel listings shown on the electronic programming guide, wherein upon the user input indicating a selection of the expansion icon, a single channel listing expands into a plurality of channel listings, wherein the processor is further caused to output the electronic programming guide to be displayed with at least one channel including a collapsing icon, wherein upon the user input indicating a selection of the collapsing icon, a plurality of channel listings collapse into a single channel listing, and wherein, after a period of time observing a pattern and history of user channel selection that is based upon a frequency of channel selection within the period of time, the processor is further caused to output the electronic programming guide upon a user's command to display the electronic programming guide with either an expansion icon or a collapsing icon based upon the observed pattern of user channel selection, wherein the expansion icon is output with channels that are observed to be selected with lesser frequency and the collapsing icon is output with channels that are observed to be selected with greater frequency.

11. The computer-readable storage medium of claim 10, wherein the processor is caused to output the electronic program guide to be displayed with at least one channel listing including the expansion icon, and wherein, upon expansion of the single channel listing into the plurality of channel listings, at least one of the plurality of channel listings is provided to include the collapsing icon, wherein upon receiving a second user input indicating a selection of the collapsing icon, a plurality of channel listings collapse into the single channel listing.

12. The computer-readable storage medium of claim 10, wherein the processor is caused to output the electronic program guide to be displayed with at least one channel including the collapsing icon, and wherein, upon collapsing the plurality of channel listings into the single channel listing, the single channel listing is provided to include the expansion icon, wherein upon receiving a second user input indicating a selection of the expansion icon, the single channel listing expands into the plurality of channel listings.

* * * * *